United States Patent
Reider et al.

(10) Patent No.: US 11,968,046 B2
(45) Date of Patent: Apr. 23, 2024

(54) REDUNDANCY CONTROL FOR DATA TRAFFIC THROUGH A WIRELESS LINK

(71) Applicant: Telefonaktiebolaget LM Ericsson (publ), Stockholm (SE)

(72) Inventors: Norbert Reider, Tényö (HU); Hubertus Munz, Aachen (DE); Sándor Rácz, Cegléd (HU); Géza Szabó, Kecskemét (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/774,371

(22) PCT Filed: Nov. 6, 2019

(86) PCT No.: PCT/EP2019/080415
§ 371 (c)(1),
(2) Date: May 4, 2022

(87) PCT Pub. No.: WO2021/089139
PCT Pub. Date: May 14, 2021

(65) Prior Publication Data
US 2022/0368463 A1    Nov. 17, 2022

(51) Int. Cl.
*H04L 1/1607*    (2023.01)
*H04L 1/00*    (2006.01)
(Continued)

(52) U.S. Cl.
CPC .......... *H04L 1/1685* (2013.01); *H04L 1/1819* (2013.01); *H04L 1/1887* (2013.01);
(Continued)

(58) Field of Classification Search
CPC ... H04L 1/1685; H04L 1/1819; H04L 1/1887; H04L 1/1896; H04L 45/24; H04L 2001/0097
(Continued)

(56) References Cited

U.S. PATENT DOCUMENTS

| | | | |
|---|---|---|---|
| 2006/0028999 A1* | 2/2006 | Iakobashvili | H04L 43/08 370/252 |
| 2019/0173971 A1* | 6/2019 | Na | H04W 4/70 |
| 2022/0368463 A1* | 11/2022 | Reider | H04L 1/1887 |

FOREIGN PATENT DOCUMENTS

| | | |
|---|---|---|
| CN | 1940787 B | 3/2011 |
| CN | 103428060 A | 12/2013 |

(Continued)

OTHER PUBLICATIONS

Halepovic et al., On the Performance of Redundant Traffic Elimination in WLANs, 2012, IEEE, pp. 5434-5439. (Year: 2012).*

(Continued)

*Primary Examiner* — John J Tabone, Jr.
(74) *Attorney, Agent, or Firm* — Rothwell, Figg, Ernst & Manbeck, P.C.

(57) ABSTRACT

A device (150) is arranged on a source side of a wireless link (50) and receives data traffic from one or more source devices (201, 202, 203). The device (150) forwards the data traffic via the wireless link (50) and via a further device (11), which is arranged on a destination side of the wireless link (50), towards one or more destination devices (21, 22, 23, 24). The device (150) receives redundancy information from the further device (11). The redundancy information indicates redundant payload which is common to multiple data frames in the data traffic forwarded by the device (150). Based on the redundancy information, the device (150)

(Continued)

removes the indicated redundant payload from at least a part of the data traffic to be forwarded by the device (150).

19 Claims, 8 Drawing Sheets

(51) Int. Cl.
   *H04L 1/1812*  (2023.01)
   *H04L 1/1867*  (2023.01)
   *H04L 45/24*   (2022.01)
(52) U.S. Cl.
   CPC ............ *H04L 1/1896* (2013.01); *H04L 45/24* (2013.01); *H04L 2001/0097* (2013.01)
(58) Field of Classification Search
   USPC ................ 714/712, 748–750; 370/328–331; 455/434
   See application file for complete search history.

(56) References Cited

FOREIGN PATENT DOCUMENTS

| | | |
|---|---|---|
| CN | 104378186 A | 2/2015 |
| EP | 2 020 787 A1 | 2/2009 |
| EP | 2 045 680 A2 | 4/2009 |
| EP | 2 042 959 B1 | 8/2018 |
| WO | 2019/209482 A1 | 10/2019 |

OTHER PUBLICATIONS

Halepovic et al., Enhancing redundant network traffic elimination, 2012, Elsevier B.V., pp. 795-809. (Year: 2012).*
Zhang et al., On Protocol-Independent Data Redundancy Elimination, 2014, IEEE, vol. 16, No. 1, pp. 455-472. (Year: 2014).*
International Search Report and Written Opinion with Transmittal dated Jul. 17, 2020 in International Application No. PCT/EP2019/080415 (12 pages).

* cited by examiner

REDUNDANCY CONTROL FOR DATA TRAFFIC THROUGH A WIRELESS LINK

CROSS REFERENCE TO RELATED APPLICATION(S)

This application is a 35 U.S.C. § 371 National Stage of International Patent Application No. PCT/EP2019/080415, filed Nov. 6, 2019.

TECHNICAL FIELD

The present invention relates to methods for controlling transmission of data in a wireless communication network and to corresponding devices, systems, and computer programs.

BACKGROUND

In industrial automation environments, data transmissions may be utilized for controlling various processes or devices, such as robots or processing machines. While wire-based communication provides a reliable and well-established way of conveying such data transmissions, utilization of wireless communication may provide several benefits. For example, wireless communication may provide more flexibility and facilitate installation.

However, in the case of wireless communication also typical constraints of wireless technologies may need to be considered. For example, radio resources utilized by a wireless communication technology are typically considered as scarce resources. It is therefore desirable to utilize the radio resources as efficiently as possible. On the other hand, limited availability of radio resources may result in increased latency of data transmissions. Further, since wireless communication may be affected by interference and variable radio channel conditions, also reliability needs to be considered.

In the 5G ($5^{th}$ Generation) radio technology developed by 3GPP ($3^{rd}$ Generation Partnership Project), also referred to as NR (New Radio) technology, a service referred to as URLLC (Ultra-Reliable Low-Latency Communication) may be used to provide reliable low latency communication with maximum delays in the range of a few milliseconds. However, with decreasing latency limits URLLC requires more radio resources. This may limit the number of possible URLLC connections that can be served with a given available bandwidth. The number of possible URLLC connections is regarded as a relevant KPI (Key Performance Indicator) of a wireless network deployment, in particular for industrial automation environments, where a high number of parallel wireless connections may be required for controlling a large number of processes and devices at a factory site, without requiring particularly high data throughput on the wireless connections. Even though the URLLC feature of the NR technology provides characteristics which are desirable for wireless communication in an industrial automation environment, also other wireless technologies may be utilized, such as the 4G ($4^{th}$ Generation) radio technology developed by 3GPP, also referred to as LTE (Long Term Evolution) technology.

There exist several possibilities of connecting industrial automation devices, e.g., servo motors, actuators, robot arms, conveyor belts, or the like, to a wireless network. According to one example, one industrial automation device can be connected to one wireless gateway. According to a further example, multiple wireless devices can be connected to one wireless gateway. The wireless gateway may be implemented by a user terminal, also referred to as UE (user equipment). In each case, this may result in a situation where many industrial automation devices share the same radio resources, because even if multiple UEs are used as wireless gateways, there is a high likelihood that these UEs will be connected to the same cell of the wireless network.

In industrial automation environments occurrence of cyclic communication patterns is quite typical. For example, a controller may send a command to an industrial automation device and might await a feedback from the industrial automation device as a reply, e.g., containing certain status information and/or measurement results, forming a control loop. A cycle time of the control loop may be defined as the time between two consecutive commands sent from the controller to the industrial automation device. In application scenarios which are either safety-critical or are subject to certain accuracy requirements, typically lower cycle times are utilized, i.e., the controller and the industrial automation device communicate more frequently.

In practical scenarios, the communication patterns may be more complex. For example, the communication may involve more devices than a single controller and a single industrial automation device, e.g., multiple industrial automation devices receiving commands from one or even multiple controllers, including the possibility of using cycle times which differ between the involved industrial automation devices or controllers. Some industrial automation applications are polling based to avoid a need of synchronization of the controller and the industrial automation device. In such cases, the industrial automation device may send the feedback or other data in response to a polling request from the controller, without being aware about any cycle time. Still further, the utilized wireless technology may introduce further cycle times, e.g., by requiring that successfully received data transmissions are acknowledged within a certain time.

For such cyclic communication pattern, a maximum latency may be defined. In industrial automation environments, the maximum latency is also referred to as "deadline". The deadline may correspond to a time interval in which the communication needs to be successfully completed. In the above-mentioned example of a controller sending commands to an industrial automation device, the deadline may be defined by a time interval starting when sending the command and within which the feedback needs to be received. Depending on the application, deadline violations may be allowed to a certain extent. For example, one deadline violation may be tolerated, but multiple deadline violations in consecutive cycles or within a certain time window not. A potential reaction to deadline violations is a shutdown of the industrial automation device to avoid safety issues. The deadline requirements may result in certain constraints with respect to managing and controlling the wireless communication. For example, this may result in a requirement to avoid queueing of data as far as possible, because queuing of data typically leads to additional latency.

As mentioned above, wireless communication is typically resource constrained, e.g., due to sharing of the same radio resources by multiple devices. On the other hand, the communication patterns occurring in industrial automation environments are typically not compatible with optimized utilization of shared resources.

Accordingly, there is a need for techniques which allow for efficiently transmitting data traffic in an industrial automation environment by wireless communication.

SUMMARY

According to an embodiment, a method of controlling data transmission in a wireless network is provided. According to the method, a device is arranged on a source side of a wireless link. The device receives data traffic from one or more source devices. The device forwards the data traffic via the wireless link and via a further device, which is arranged on a destination side of the wireless link, towards one or more destination devices. The device receives redundancy information from the further device. The redundancy information indicates redundant payload which is common to multiple data frames in the data traffic forwarded by the device. Based on the redundancy information, the device removes the indicated redundant payload from at least a part of the data traffic to be forwarded by the device towards the one or more destination devices.

According to a further embodiment, a method of controlling data transmission in a wireless network is provided. According to the method, a device is arranged on a destination side of a wireless link. The device receives data traffic from one or more source devices via the wireless link and via a further device, which is arranged on a source side of the wireless link. The device forwards the received data traffic towards one or more destination devices. The device detects redundant payload which is common to multiple data frames in the data traffic received by the device. The device sends redundancy information indicating the detected redundant payload to the further device. In response to sending the redundancy information, the device receives further data traffic from which the indicated redundant payload was removed by the further device. The device reconstructs the removed redundant payload and forwards the received further data traffic with the reconstructed redundant payload towards the one or more destination devices.

According to a further embodiment, a device for handling data traffic on a source side of a wireless communication link is provided. The device is configured to receive data traffic from one or more source devices. Further, the device is configured to forward the data traffic via the wireless link and via a further device, which is arranged on a destination side of the wireless link, towards one or more destination devices. Further, the device is configured to receive redundancy information from the further device. The redundancy information indicates redundant payload which is common to multiple data frames in the data traffic forwarded by the device. Further, the device is configured to, based on the redundancy information, remove the indicated redundant payload from at least a part of the data traffic to be forwarded by the device towards the one or more destination devices.

According to a further embodiment, a device for handling data traffic on a source side of a wireless communication link is provided. The device comprises at least one processor and a memory. The memory contains instructions executable by said at least one processor, whereby the device is operative to receive data traffic from one or more source devices. Further, the memory contains instructions executable by said at least one processor, whereby the device is operative to forward the data traffic via the wireless link and via a further device, which is arranged on a destination side of the wireless link, towards one or more destination devices. Further, the memory contains instructions executable by said at least one processor, whereby the device is operative to receive redundancy information from the further device. The redundancy information indicates redundant payload which is common to multiple data frames in the data traffic forwarded by the device. Further, the memory contains instructions executable by said at least one processor, whereby the device is operative to, based on the redundancy information, remove the indicated redundant payload from at least a part of the data traffic to be forwarded by the device towards the one or more destination devices.

According to a further embodiment, a device for handling data traffic on a destination side of a wireless communication link is provided. The device is configured to receive data traffic from one or more source devices via the wireless link and via a further device, which is arranged on a source side of the wireless link. Further, the device is configured to forward the received data traffic towards one or more destination devices. Further, the device is configured to detect redundant payload which is common to multiple data frames in the data traffic received by the device. Further, the device is configured to send redundancy information indicating the detected redundant payload to the further device. Further, the device is configured to, in response to sending the redundancy information, receive further data traffic from which the indicated redundant payload was removed by the further device. Further, the device is configured to reconstruct the removed redundant payload and forward the received further data traffic with the reconstructed redundant payload towards the one or more destination devices.

According to a further embodiment, a device for handling data traffic on a destination side of a wireless communication link is provided. The device comprises at least one processor and a memory. The memory contains instructions executable by said at least one processor, whereby the device is operative to receive data traffic from one or more source devices via the wireless link and via a further device, which is arranged on a source side of the wireless link. Further, the memory contains instructions executable by said at least one processor, whereby the device is operative to forward the received data traffic towards one or more destination devices. Further, the memory contains instructions executable by said at least one processor, whereby the device is operative to detect redundant payload which is common to multiple data frames in the data traffic received by the device. Further, the memory contains instructions executable by said at least one processor, whereby the device is operative to send redundancy information indicating the detected redundant payload to the further device. Further, the memory contains instructions executable by said at least one processor, whereby the device is operative to, in response to sending the redundancy information, receive further data traffic from which the indicated redundant payload was removed by the further device. Further, the memory contains instructions executable by said at least one processor, whereby the device is operative to reconstruct the removed redundant payload and forward the received further data traffic with the reconstructed redundant payload towards the one or more destination devices.

According to a further embodiment of the invention, a computer program or computer program product is provided, e.g., in the form of a non-transitory storage medium, which comprises program code to be executed by at least one processor of a device for a wireless network, in particular a device for handling data traffic on a source side of a wireless communication link. Execution of the program code causes the device to receive data traffic from one or more source devices. Further, execution of the program code causes the device to forward the data traffic via the wireless link and via a further device, which is arranged on a destination side of the wireless link, towards one or more destination devices. Further, execution of the program code causes the device to receive redundancy information from the further device. The redundancy information indicates redundant payload which is common to multiple data frames in the data traffic forwarded by the device. Further, execution of the program code causes the device to, based on the redundancy information, remove the indicated redundant payload from at least a part of the data traffic to be forwarded by the device towards the one or more destination devices.

According to a further embodiment of the invention, a computer program or computer program product is provided, e.g., in the form of a non-transitory storage medium, which comprises program code to be executed by at least one processor of a device for a wireless network, in particular a device for handling data traffic on a destination side of a wireless communication link. Execution of the program code causes the device to receive data traffic from one or more source devices via the wireless link and via a further device, which is arranged on a source side of the wireless link. Further, execution of the program code causes the device to forward the received data traffic towards one or more destination devices. Further, execution of the program code causes the device to detect redundant payload which is common to multiple data frames in the data traffic received by the device. Further, execution of the program code causes the device to send redundancy information indicating the detected redundant payload to the further device. Further, execution of the program code causes the device to, in response to sending the redundancy information, receive further data traffic from which the indicated redundant payload was removed by the further device. Further, execution of the program code causes the device to reconstruct the removed redundant payload and forward the received further data traffic with the reconstructed redundant payload towards the one or more destination devices.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to controlling data traffic in a wireless network. The wireless network may be based on the NR technology, as for example specified in 3GPP TS 38.300 V15.7.0 (2019-09), or on the LTE technology, as for example specified in 3GPP TS 36.300 V15.7.0 (2019-09).

In the illustrated concepts, a Traffic Optimizer at the Device side (TOD) and a Traffic Optimizer at the Cloud side (TOC) are provided for optimizing the data traffic. The TOD and the TOC cooperate to detect redundant payload in the data traffic and to remove at least a part of the redundant payload from the data traffic which is transmitted over a wireless link. As a result, the overall data throughput on the wireless link may be reduced. In some scenarios, the removed redundant payload may correspond to data frames to multiple destination devices but having similar payload, data frames from multiple source but having similar payload, and/or data frames which have payload that reoccurs according to a periodic pattern. In such cases, removal of the redundant payload may involve omitting data frames with the redundant payload when transmitting the data traffic over the wireless link. The omitted data frames may then be reconstructed after receiving the data traffic from the wireless link. In other cases, the redundant payload may correspond to only a part of the payload of the data frames, and this part may be omitted when transmitting the data frames over the wireless link. The omitted part of the data frame payload may then be reconstructed after receiving the data frames from the wireless link.

Figure 1:
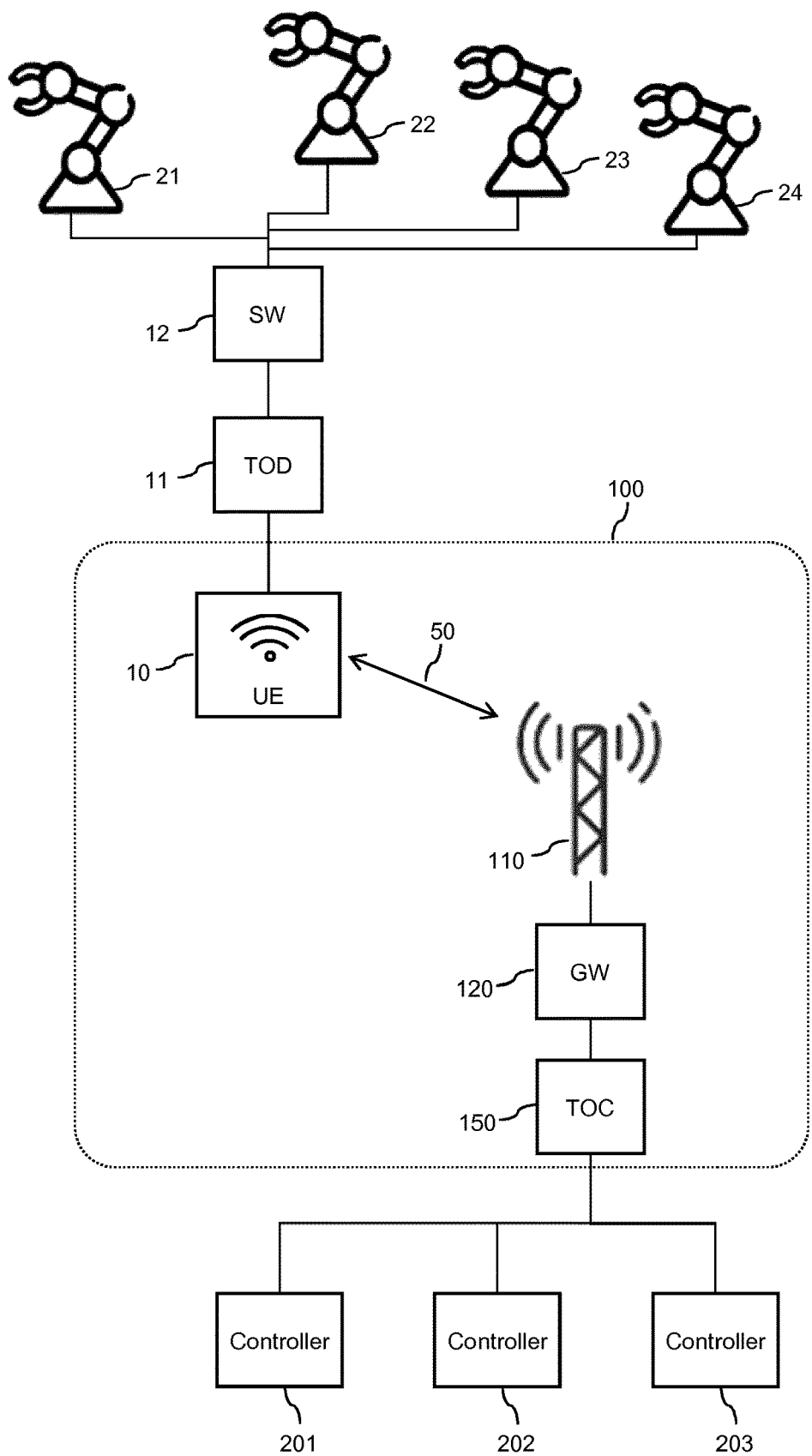
FIG. 1 schematically illustrates an exemplary data transmission scenario according to an embodiment of the invention.

FIG. 1 schematically illustrates a data transmission scenario in which the illustrated concepts may be applied. The scenario of FIG. 1 assumes that a wireless network 100 is used for connecting multiple industrial automation devices (IADs) 21, 22, 23, 24, e.g., servo motors, robot arms, conveyor belts, or the like, to a multiple industrial automation controllers (IACs) 201, 202, 203. For this purpose, the IADs 11, 12, 13 are connected, e.g., by a switch LAN (Local Area Network) and a switch (SW) 12, to a UE 10. The UE 10 is connected by a wireless link 50 to an access node 110 of the wireless network 100. In some scenarios, the wireless link may utilize the URLLC feature of the NR technology.

A gateway (GW) 120 of the wireless network 100 connects the access node 110 to the further IOCs 201, 202, 203, e.g., through a further LAN and/or through the Internet. Further, a TOD 11 is coupled between the UE 10 and the IADs 21, 22, 23, 24, and a TOC 150 is coupled between the access node 110 and the IACs 201, 202, 203. In a downlink direction, data traffic from the controllers 201, 202, 203 may thus be conveyed via the TOC 150, the wireless link 50, the UE 10, and the TOD 11 to the IACs 11, 12, 13. In an uplink direction, data traffic from the IACs 21, 22, 23, 24 may thus be conveyed via the TOD 11, the UE 10, the wireless link 50, and the TOC 150 to the IACs 201, 202, 203. The data traffic between the IACs 201, 202, 203 and the IADs 21, 22, 23, 24 may be based on Ethernet data frames. Between the IACs 201, 202, 203 and the UE 10, the data frames may be conveyed in IP (Internet protocol) data packets encapsulating one or more of the Ethernet data frames, using UDP (User Datagram Protocol) as a transport protocol. However, other transport protocols, e.g., TCP (Transmission Control Protocol), could be used as well. The IADs 21, 22, 23, 24 may be individually addressed by a corresponding Ethernet MAC (Medium Access Control) address assigned to each of the IADs 21, 22, 23, 24. The IACs may in turn be individually addressed by a corresponding IP address assigned to each of the IACs 201, 202, 203.

In the downlink direction the data traffic may include commands and/or polling requests from the IACs 201, 202, 203 to the IADs 21, 22, 23, 24. In the uplink direction, the data traffic may include status reports or other feedback from the IADs 21, 22, 23, 24 to the IACs 201, 202, 203. Accordingly, the UE 10 UE may handle data traffic for multiple IADs in parallel. The IACs 201, 202, 203 may be implemented as virtualized devices, e.g., using an edge cloud platform provided in a core network (CN) part and/or radio access network (RAN) part of the wireless network 100. Further, it is noted that while FIG. 1 illustrates the TOD 11 and the TOC 150 as separate nodes, functionalities of the TOD 11 could also be implemented as part of the UE 10, and functionalities of the TOC 150 could also be implemented within other nodes of the wireless network 100, e.g., by the GW 120 and/or by the access node 110.

Figure 2:
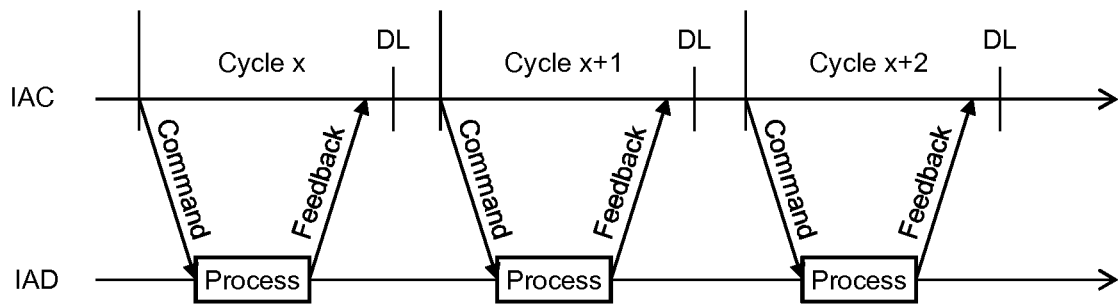
FIG. 2 schematically illustrates an example of a cyclic transmission pattern which may occur in the scenario of FIG. 1.

FIG. 2 schematically illustrates a cyclic transmission pattern that may occur in the scenario of FIG. 1, e.g., between one of the IACs 201, 202, 203 and one of the IADs 21, 22, 23, 24. In the example of FIG. 2, the IAC sends commands to the IAD and receives feedback messages from the IAD. The feedback messages may for example contain status information and/or measurement results. The exchange of commands and feedback information may be part of a control loop. A cycle time of the control loop may be defined as the time between two consecutive commands sent from the IAC to the IAD. In the example of FIG. 2, the time by when the IAC expects to receive the feedback message for a given command is denoted as "deadline". It is noted that in the scenario of FIG. 1 the communication pattern on the wireless link could actually be more complex than illustrated in FIG. 2, e.g., due to different cycle times used by different IACs 201, 202, 203 and/or for different IADs 21, 22, 23, 24. Further, the sending of the feedback messages may be triggered by polling requests from the IACs 201, 202, 203, and the timing of the polling requests may differ from the timing of the commands send by the IACs.

Figure 3:
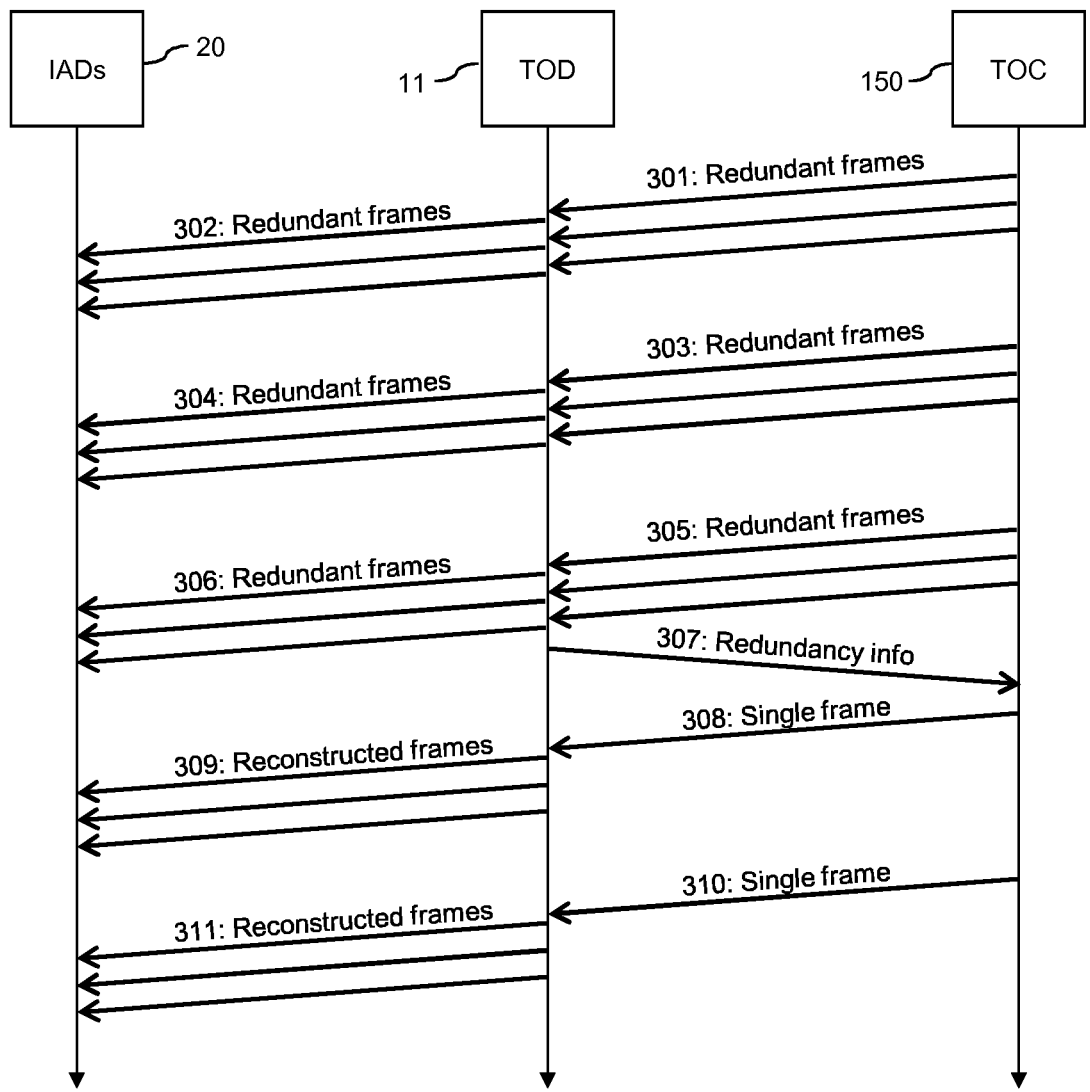
FIG. 3 schematically illustrates an example of processes in which downlink data traffic is controlled according to an embodiment of the invention.

FIG. 3 shows exemplary processes for illustrating operation of the TOC 150 and the TOD 11 in the case of optimizing downlink data traffic from the IACs 201, 202, 203 to the IADs 21, 22, 23, 24. The processes of FIG. 3 involve the TOC 150, the TOD 11, and a group 20 of IADs, e.g., including at least some of the IADs 21, 22, 23, 24.

As mentioned above, the data traffic from the IACs 201, 202, 203 to the IADs 21, 22, 23, 24 may include polling requests. Upon receipt of such polling request, the IAD 21, 22, 23, 24 will send a status report. In the polling requests are typically rather simplistic regarding their information content. In particular, the polling requests typically have almost the same content each time they are transmitted, i.e., there is almost no variation among the polling requests as transmitted over time from which a given IOC 201, 202, 203 to a given IAD 21, 22, 23, 24. Further, the polling requests are also highly similar for different IADs 21, 22, 23, 24 and different IACs 201, 202, 203. This will typically cause redundancy of payload of data frames over the wireless link 50.

FIG. 3 illustrates redundant data frames 301, 303, 305 which are forwarded via the wireless link 50 from the TOC 150 to the TOD 11. As illustrated by 302, 304, 306, the TOD 11 forwards the redundant data frames to the group 20 of IADs. The redundant data frames include redundant payload, e.g., in the form of polling requests. The TOD 11 analyzes the forwarded data frames, detects the redundant payload, and determines a traffic profile describing the redundant payload. The traffic profile may for example indicate the redundant payload, a destination of the redundant payload, e.g., in terms of an address of the IAD 21, 22, 23, 24 the data frames are forwarded to, and/or a source of the redundant payload, e.g., e.g., in terms of an address of the IAC 201, 202, 203, the data frames are received from. Further, the traffic profile may indicate a timing according to which the redundant payload is transmitted, e.g., in terms of a periodic pattern. Still further, the traffic profile may indicate a pattern of sequence numbers and/or checksums included in the redundant payload. Various types of traffic inspection mechanisms may be applied in the TOD 11 to learn the traffic profile. For example, such traffic inspection mechanism may operate by detecting parts of the data frames which vary between the data frames and determining a correlation between the data frames addressed to different IADs 21, 22, 23, 24 and/or between data frames of the same stream, i.e., data frames addressed to the same IAD 21, 22, 23, 24 and originating from the same IAC 201, 202, 203.

In a scenario like illustrated in FIG. 1, where multiple IADs 21, 22, 23, 24, are connected to the same UE 10, the TOC 150 can optimize the downlink data traffic by replacing multiple redundant data frames to the different IADs 21, 22, 23, 24 by a single redundant data frame, i.e., by omitting all but one of the redundant data frames. Upon receiving the remaining single data frame, the TOD 11 replicates the data frame for forwarding to all of the originally intended recipients, as defined in the traffic profile. This may include providing the replicated data frames with the correct addresses of the respective IAD 21, 22, 23, 24. Further, this may involve recreating the sequence numbers and/or checksums of the replicated data frames.

In the example of FIG. 3, the TOD 11 may for example learn from the received redundant data frames 301, 303, 305 that the data traffic to the group 20 of IADs includes polling requests which are highly similar for the IADs 21, 22, 23, 24 of the group 20, and that the polling requests are sent according to a periodic time pattern. Further, the TOD 11 may learn the addresses of the IADs 21, 22, 23, 24 the data frames 301, 303, 305 are sent to. The resulting traffic profile may then for example indicate that each time a polling request is sent to one of the IADs 21, 22, 23, 24, a similar polling request is also sent to the other IADs 21, 22, 23, 24, and how the polling requests to the other IADs 21, 22, 23, 24 differ from each other, e.g., in terms of destination address, source address, sequence number, or the like. With this information, the TOD 11 can use one polling request to replicate the other polling requests.

Having learnt the traffic profile, the TOD 11 sends redundancy information 307 indicating the identified redundant payload and the underlying traffic profile to the TOC 150. In some scenarios, the TOC 150 may also confirm to the TOD 11 that it received the redundancy information and will now optimize the forwarded data traffic by removing the redundant payload. For subsequently forwarded data frames, the TOC 150 may then optimize the data traffic by removing the redundant payload before forwarding the data traffic via the wireless link 50. In the example of FIG. 3 this involves replacing the redundant data frames with a single data frame 308, 310, which is forwarded to the TOD 11. The TOD 11 then reconstructs the removed redundant payload by using the single data frame 308, 310 to replicate the omitted redundant data frames. The TOD 11 can then forward the reconstructed data frames 309, 311 to the group 20 of IADs.

The redundancy information 307 may for example be transmitted in an IP data packet addressed to the TOC 150. The redundancy information 307 may indicate the redundant payload in terms of a destination address of a main IAD and destination addresses of one or more redundant IADs, which receive the same redundant payload as the main IAD. Further, the redundancy information may indicate detected traffic parameters like periodicity, sequence numbers, payload size, payload content, a payload variation pattern, or the like. When optimizing the data traffic, the TOC 150 may omit the data frames addressed to the redundant IADs and only forward the data frames addressed to the main IAD.

If subsequently the TOC 150 detects a change of traffic pattern in the forwarded data traffic, e.g., if there is a change of the data frame payload that deviates from the indicated traffic profile, the TOC 150 can fall back to forwarding the complete payload, like for the data frames 301, 303, 305, so that a loss of potentially relevant information can be avoided. It is noted that in some situations, in response to receiving the redundancy information, the TOC 150 could also decide not to apply the optimization of the forwarded data traffic, e.g., if the data traffic currently pending to be forwarded at the TOC 150 already deviates from the indicated traffic profile, or if the TOC 150 is configured with information indicating that the identified redundant payload is of a high priority type, for which such optimization processes are not allowed.

It is noted that a redundancy due to similar polling requests being sent to multiple IADs 21, 22, 23, 24 is merely an example of potential redundancies which can be addressed by the cooperative optimization applied by the TOC 150 and the TOD 11. For example, redundancies could occur according to a more complex pattern, e.g., where polling requests are sent according to a pattern which alternates between two or more of the TODs 21, 22, 23, 24. Further, redundancies may also occur for other types of payload than polling requests, e.g., for commands sent from the IACs 201, 202, 203 to the IADs 21, 22, 23, 24. As compared to the polling requests, for commands there may be a higher variability of the payload over time and also a higher variability of the payload between different IADs 21, 22, 23, 24. This additional variability may be addressed by considering corresponding information in the traffic profile, e.g., by indicating position and/or sizes of redundant parts of the payload within a data frame, so that such parts can be removed individually, while keeping other parts of the data frame. Accordingly, rather by omitting complete data frames at the TOC 150 and replicating these data frames at the TOD 11, the optimization may also involve removing redundant parts of the payload from a data frame and reconstructing the removed parts at the TOD 11.

Figure 4:
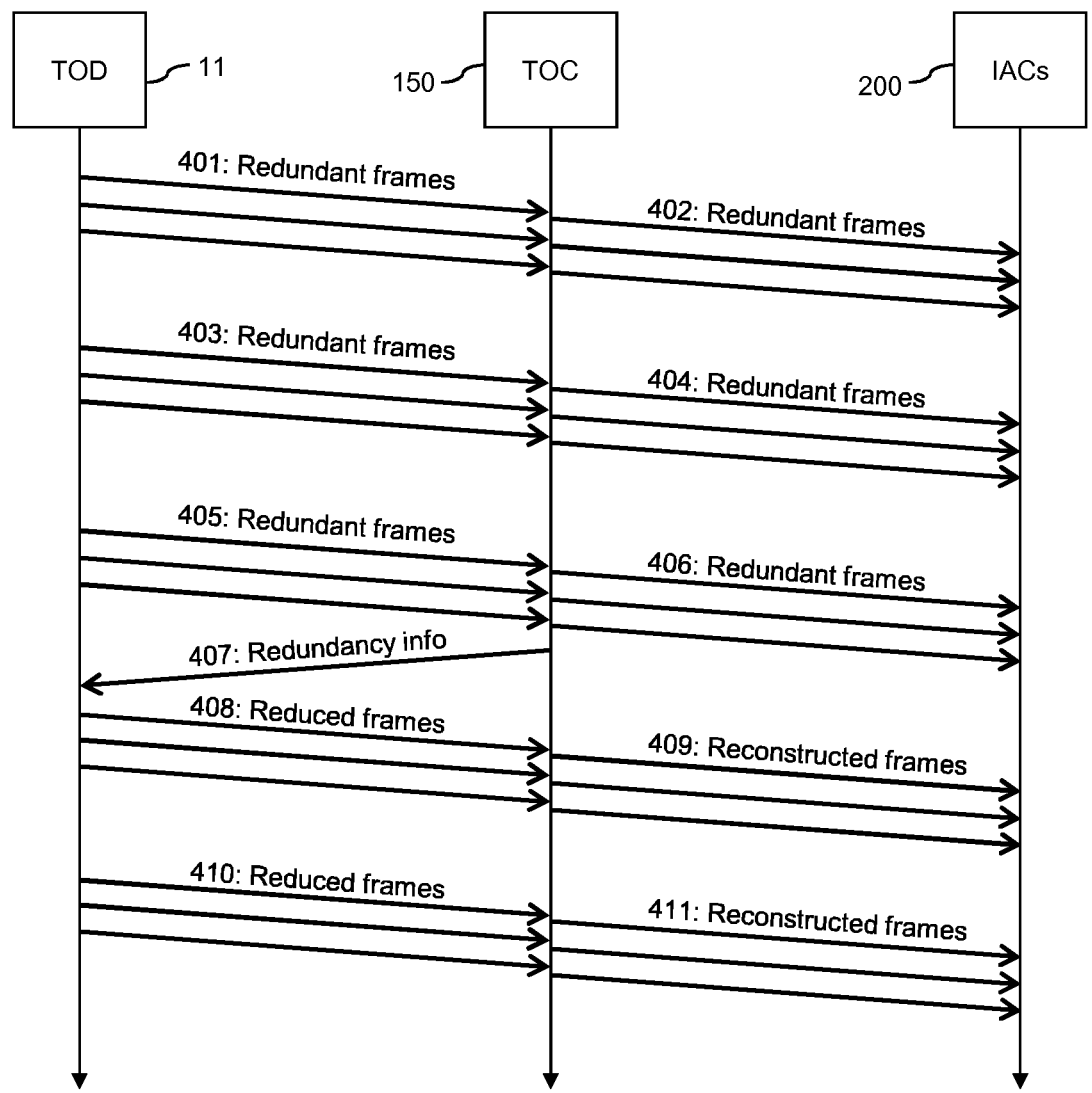
FIG. 4 schematically illustrates an example of processes in which uplink data traffic is controlled according to an embodiment of the invention.

FIG. 4 shows exemplary processes for illustrating operation of the TOC 150 and the TOD 11 in the case of optimizing uplink data traffic from the IADs 21, 22, 23, 24 to the IACs 201, 202, 203. The processes of FIG. 4 involve the TOD 11, the TOC 150, and a group 200 of IACs, e.g., including at least some of the IACs 201, 202, 203.

As mentioned above, the data traffic from the IADs 21, 22, 23, 24 to the IACs 201, 202, 203, 204 may include status reports. Such status reports may also include data subject to frequent changes, such as real-time measurement values or real-time data on robot movements. On the other hand, the status reports may also include data which is more or less static, such as device or deployment configuration information, serial numbers, or environmental measurements like temperature or atmospheric pressure. Accordingly, while the payload of the status reports may include information which redundantly reoccurs over time or for different IADs 21, 22, 23, 24, parts of the payload are typically non-redundant.

FIG. 4 illustrates redundant data frames 401, 403, 405 which are forwarded via the wireless link 50 from the TOD 11 to the TOC 150. As illustrated by 402, 404, 406, the TOD 11 forwards the redundant data frames to the group 200 of IACs. The redundant data frames include redundant payload corresponding to certain parts of the redundant data frames 401, 403, 405, e.g., in the form of substantially static information or information which is commonly reported by multiple IADs 21, 22, 23, 24. The TOC 150 analyzes the forwarded data frames, detects the redundant payload, and determines a traffic profile describing the redundant payload. The traffic profile may for example indicate the redundant payload, a destination of the redundant payload, e.g., in terms of an address of the IAC 201, 202, 203 the data frames are forwarded to, and/or a source of the redundant payload, e.g., e.g., in terms of an address of the IAD 21, 22, 23, 24 the data frames are received from. Further, the traffic profile may indicate a timing according to which the redundant payload is transmitted, e.g., in terms of a periodic pattern. Still further, the traffic profile may indicate a pattern of sequence numbers and/or checksums included in the redundant payload. Various types of traffic inspection mechanisms may be applied in the TOC 150 to learn the traffic profile. For example, such traffic inspection mechanism may operate by detecting parts of the data frames which vary between the data frames and determining a correlation between the data frames originating from different IADs 21, 22, 23, 24 and/or addressed to different IACs 201, 202, 203. Such correlations may in particular occur between data frames of the same stream, i.e., data frames originating from the same IAD 21, 22, 23, 24 and addressed to the same IAC 201, 202, 203. However, in some cases such correlations may also occur between data frames of the of different streams, i.e., data frames originating from different IADs 21, 22, 23, 24 or addressed to different IACs 201, 202, 203. For example, when sending status reports in a given cycle, the cycle number could be part of the status reports and be the same for all IADs 21, 22, 23, 24 and all IACs 201, 203, 204.

The TOD 11 can optimize the uplink data traffic by removing parts corresponding to the detected redundant payload from the data frames while keeping non-redundant parts of the data frames. Upon receiving the resulting reduced data frames, the TOC 150 reconstructs the removed parts according to the traffic profile. This may include supplementing the the data frames with information derived from the traffic profile.

In the example of FIG. 4, the TOC 150 may for example learn from the received redundant data frames 401, 403, 405 that the data traffic to the group 200 of IACs includes status reports with parts which are highly similar over time. In some cased, the TOC 150 may also learn that the status reports include information which is highly similar for multiple source IADs 21, 22, 23, 24 or information which is highly similar for multiple destination IACs 201, 203, 204. Further, the TOD 150 may learn the position of such redundant parts within the data frames 401, 403, 405. The TOD 150 may also learn the addresses of the IADs 21, 22, 23, 24 the data frames 401, 403, 405 originate from and/or the addresses of the IACs 201, 202, 203 the data frames 401, 403, 405 are sent to. The resulting traffic profile may then for example indicate that when a status report is sent by one of the IADs 21, 22, 23, 24, future status reports from the IAD 21, 22, 23, 24 will including similar information, and which part of the status report includes the similar information. Further, the resulting traffic profile may then for example indicate that each time a status report is sent by one of the IADs 21, 22, 23, 24, a status report including similar information is also sent by one or more other IADs 21, 22, 23, 24, and which part of the status report includes the similar information. Further, the TOC 150 may also learn variation patterns of such similar information. With the learnt information, the TOC 150 can use deduce parts of certain received data frames to reconstruct omitted parts of other data frames.

Having learnt the traffic profile, the TOC 150 sends redundancy information 407 indicating the identified redundant payload and the underlying traffic profile to the TOD 11. In some scenarios, the TOD 11 may also confirm to the TOC 150 that it received the redundancy information and will now optimize the forwarded data traffic by removing the redundant payload. For subsequently forwarded data frames, the TOD 11 may then optimize the data traffic by removing the redundant payload before forwarding the data traffic via the wireless link 50. In the example of FIG. 4 this involves removing redundant parts of the data frames, resulting in reduced data frames 408, 410, which are forwarded to the TOC 150. The TOC 150 then reconstructs the removed redundant payload by using the traffic profile and other received data frames to determine the omitted redundant parts and supplement the omitted redundant parts. The TOC 150 can then forward the reconstructed data frames 409, 411 to the group 200 of IACs.

The redundancy information 407 may for example be transmitted in an IP data packet addressed to the TOD 11. The redundancy information 407 may indicate the redundant payload in terms of a position and/or size of a data frame part including the redundant payload, e.g., in terms of a byte location and/or size in bytes. Further, the redundancy information may indicate the redundant payload in terms of a source address of the IAD which sends the redundant payload and/or a destination address of the IAC receiving the redundant payload. Further, the redundancy information may indicate the redundant payload in terms of a source address of a main IAD and source addresses of one or more redundant IADs, which send the same redundant payload as the main IAD. Further, the redundancy information may indicate detected traffic parameters like periodicity, sequence numbers, payload size, payload content, a payload variation pattern, or the like. When optimizing the data traffic, the TOD 11 may omit the indicated redundant parts of the data frames.

If subsequently the TOD 11 detects a change of traffic pattern in the forwarded data traffic, e.g., if there is a change of the data frame payload that deviates from the indicated traffic profile, the TOD 11 can fall back to forwarding the complete payload, like for the data frames 401, 403, 405, so that a loss of potentially relevant information can be avoided. It is noted that in some situations, in response to receiving the redundancy information, the TOD 11 could also decide not to apply the optimization of the forwarded data traffic, e.g., if the data traffic currently pending to be forwarded at the TOD 11 already deviates from the indicated traffic profile, or if the TOD 11 is configured with information indicating that the identified redundant payload is of a high priority type, for which such optimization processes are not allowed.

In some cases, the optimization of the data traffic may also involve removing further payload from the forwarded data traffic. In particular, such removal may concern payload classified to have a low priority. Such low priority payload may for example be transmitted at a lower periodicity than other payload or could even be completely omitted. For example, the status reports from the IADs 21, 22, 23, 24, to the IACs 201, 202, 203 may include different parts of the payload to which different priority levels are assigned. According to these different priority levels, the TOD 11 may selectively remove the payload from some of the data frames, e.g., from every n-th data frame originating from a given IAD 21, 22, 23, 24, where n is an integer depending on the priority level. The TOC 150 may then reconstruct the omitted parts, e.g., using an interpolation mechanism or more advanced machine learning mechanism.

According to an exemplary scenario, status reports when controlling motion of a servo may contain information elements like actual position of the servo, actual velocity of the servo, actual torque measured on the servo, input/output data, gyroscope data, measured temperature, and data from an accelerometer associated with the servo. In accordance with the relevance of these information elements in the control application, different priority levels may be assigned to the information elements. This may for example involve configuration of the TOD 11 by the control application, e.g., as executed on the respective IAC 201, 202, 203. For example, a high, a medium, and a low priority level could be defined, and the high priority level could be assigned to the position, velocity and torque information elements, because they may be updated and utilized in each control cycle. The input/output data information element could be assigned the medium priority level, and the other information elements, including the gyroscope data, temperature data, and accelerometer data, may be assigned the lowest priority level. The TOD 11 could then optimized the data traffic conveying the status reports by keeping the position, velocity and torque information elements in all the status reports, removing the input/output information element from all but every tenth status report, and removing the gyroscope data, temperature data, and accelerometer data from all but every $100^{th}$ status report. The TOC 150 may utilize an interpolation mechanism to reconstruct the removed information elements from the less frequently transmitted information elements. Further, the TOC 150 could utilize a machine learning mechanism to reconstruct the removed information elements. Such machine learning mechanism could be trained in a phase when completely transmitting the status reports, also including the information elements of the medium and low priority level.

It is noted that the above-mentioned priority based removing of payload could of course also be applied by the TOC 150 for optimizing downlink data traffic. Further, the priority based removing of payload may be applied in addition to the above-mentioned removing of detected redundant payload or as an alternative to the removing of detected redundant payload.

Figure 5:
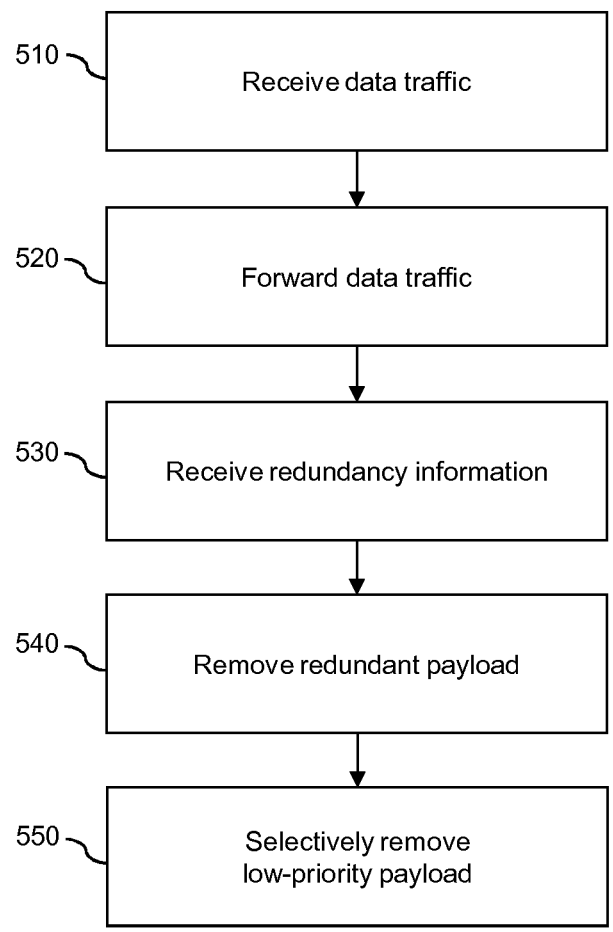
FIG. 5 shows a flowchart for illustrating a method according to an embodiment of the invention.

FIG. 5 shows a flowchart for illustrating a method of controlling data transmission in a wireless network. The method of FIG. 5 may be utilized for implementing the illustrated concepts in a device handling the data traffic on a source side of a wireless link, e.g., the above-mentioned wireless link 50. In the case of downlink data traffic, the device may correspond to the above-mentioned TOC 150. In the case of downlink data traffic, the device may also be implemented within a node of the wireless communication network, e.g., as part of a user plane gateway, such as the above-mentioned gateway 120, or within an access node, such as the above-mentioned access node 110. In the case of uplink data traffic, the device may correspond to the above-mentioned TOD 11. In the case of uplink data traffic, the device may also be implemented within a UE for connecting to the wireless network, e.g., such as the above-mentioned UE 10.

If a processor-based implementation of the device is used, at least some of the steps of the method of FIG. 5 may be performed and/or controlled by one or more processors of the device. Such device may also include a memory storing program code for implementing at least some of the below described functionalities or steps of the method of FIG. 5.

At step 510, the device receives data traffic from one or more source devices. In the case of downlink data traffic, the one or more source devices may for example correspond to one or more of the above-mentioned IACs 201, 202, 203. In the case of uplink data traffic, the one or more source devices may for example correspond to one or more of the above-mentioned IADs 21, 22, 23, 24.

At step 520, the device forwards the data traffic towards one or more destination devices. In the case of downlink data traffic, the one or more destination devices may for example correspond to one or more of the above-mentioned IADs 21, 22, 23. In the case of uplink data traffic, the one or more destination devices may for example correspond to one or more of the above-mentioned IACs 201, 202, 203. The forwarding of the data traffic towards the one or more destination devices is accomplished via the wireless link and via a further device, arranged on a destination side of the wireless link. In the case of downlink data traffic, the further device may correspond to the above-mentioned TOD 11. In the case of uplink data traffic, the further device may correspond to the above-mentioned TOC 150.

Accordingly, in some scenarios the one or more source devices may include one or more industrial automation controllers and the one or more destination devices may include one or more industrial automation devices controlled by the one or more industrial automation controllers. In such scenarios the data traffic to be forwarded by the device may include polling requests from the one or more industrial automation controllers to the one or more industrial automation devices and/or control commands from the one or more industrial automation controllers to the one or more industrial automation devices.

In other scenarios, the one or more destination devices may include one or more industrial automation controllers and the one or more source devices may include one or more industrial automation devices controlled by the one or more industrial automation controllers. In such scenarios, the data traffic forwarded by the device may include status reports from the one or more industrial automation devices to the one or more industrial automation controllers.

At step 530, the device receives redundancy information from the further device. The redundancy information indicates redundant payload which is common to multiple data frames in the data traffic forwarded by the device. In the case of downlink data traffic, the redundancy information may for example correspond to above-mentioned redundancy information 307. In the case of uplink data traffic, the redundancy information may for example correspond to above-mentioned redundancy information 407.

In some scenarios, the one or more destination devices may correspond to multiple destination devices. In this case the multiple data frames may include multiple data frames addressed to different ones of the destination devices. In such scenarios, the redundancy information may indicate the destination devices the multiple data frames are addressed to.

In some scenarios, the one or more source devices may correspond to multiple source devices. In this case the multiple data frames may include multiple data frames from different ones of the source devices. In such scenarios, the redundancy information may indicate the source devices the multiple data frames originate from.

In some scenarios, the multiple data frames may include multiple data frames transmitted at different time instances. In such scenarios, the different time instances may define a periodic pattern and the redundancy information may indicate the periodic pattern.

In some scenarios, the redundancy information may also indicate a variation pattern of the redundant payload, sequence numbers of the multiple data frames, and/or a pattern underlying the sequence numbers of the multiple data frames.

At step 540, the device removes the indicated redundant payload from at least a part of the data traffic to be forwarded by the device towards the one or more destination devices. This is accomplished based on the redundancy information received at step 530.

In some scenarios, the device may remove the indicated redundant payload by omitting at least one data frame from the data traffic to be forwarded. Alternatively or in addition, the device may remove the indicated redundant payload by removing the redundant payload from at least one data frame of the data traffic to be forwarded.

At step 550, the device may utilize priorities assigned to one or more parts of the payload to selectively remove the one or more parts of the payload from the data traffic to be forwarded. In particular, the device may remove low-priority parts of the payload from the data traffic to be forwarded. The selective removal may be accomplished in such a way that a part of the payload, to which a high low priority is assigned, is removed more frequently than other parts of the payload. It is noted that in some scenarios the priority-based removing of payload of step 550 could also be applied independently from the redundancy based removing of payload of step 540. In such alternative method, steps 530 and 540 could be omitted.

Figure 6:
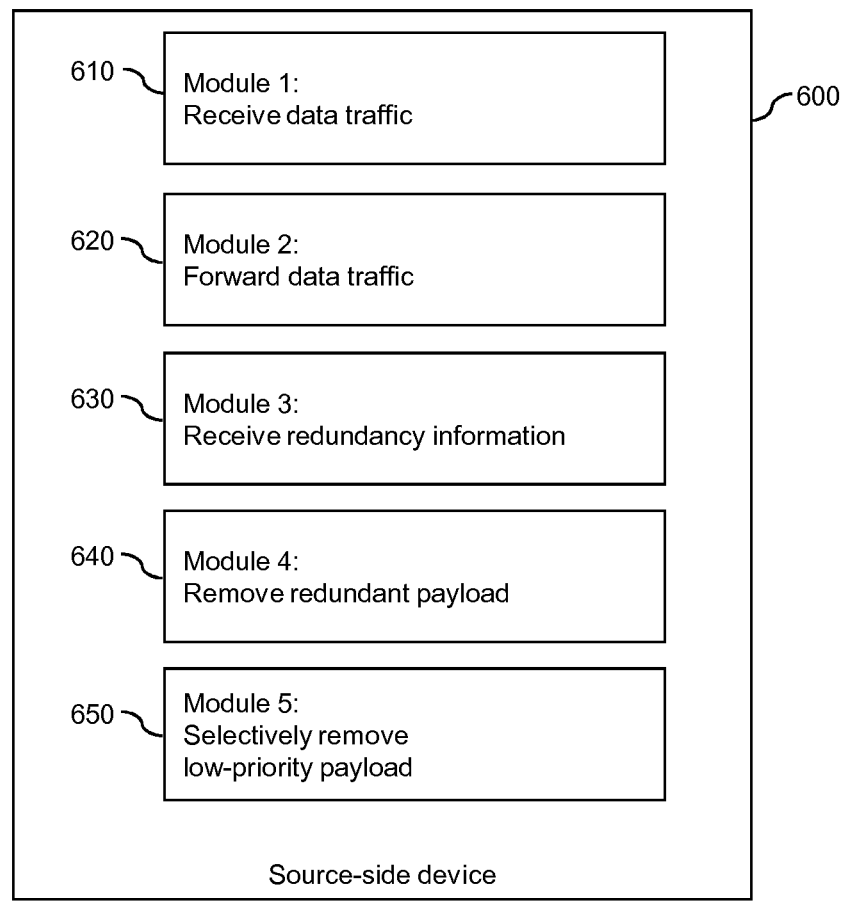
FIG. 6 shows an exemplary block diagram for illustrating functionalities of a network element implementing functionalities corresponding to the method of FIG. 5.

FIG. 6 shows a block diagram for illustrating functionalities of a device 600 which operates according to the method of FIG. 5. The device 600 may have the purpose of handling data traffic on a source side of a wireless link, e.g., the above-mentioned wireless link 50, and may therefore also be referred to as a source-side device. In the case of downlink data traffic, the device 600 may correspond to the above-mentioned TOC 150. In the case of uplink data traffic, the device 600 may correspond to the above-mentioned TOD 11. As illustrated, the device 600 may be provided with a module 610 configured to receive data traffic, such as explained in connection with step 510. Further, the device 600 may be provided with a module 620 configured to forward the data traffic, such as explained in connection with step 520. Further, the device 600 may be provided with a module 630 configured to receive redundancy information, such as explained in connection with step 530. Further, the device 600 may be provided with a module 640 configured to remove redundant payload, such as explained in connection with step 540. Further, the device 600 may be provided with a module 550 configured to selectively remove payload based on priorities, such as explained in connection with step 550.

It is noted that the device 600 may include further modules for implementing other functionalities, such as known functionalities of a user plane gateway, access node, or UE. Further, it is noted that the modules of the device 600 do not necessarily represent a hardware structure of the device 600, but may also correspond to functional elements, e.g., implemented by hardware, software, or a combination thereof.

Figure 7:
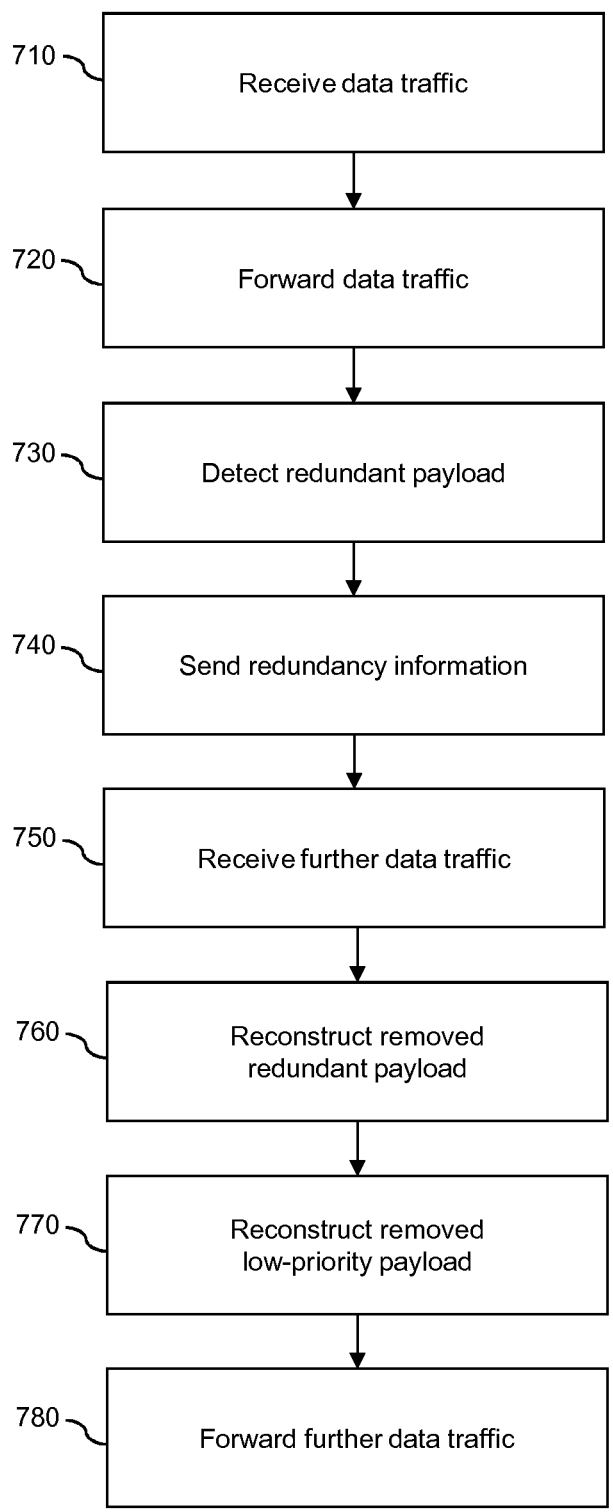
FIG. 7 shows a flowchart for illustrating a further method according to an embodiment of the invention.

FIG. 7 shows a flowchart for illustrating a further method of controlling data transmission in a wireless network. The method of FIG. 7 may be utilized for implementing the illustrated concepts in a device handling the data traffic on a destination side of a wireless link, e.g., the above-mentioned wireless link 50. In the case of downlink data traffic, the device may correspond to the above-mentioned TOD 11. In the case of downlink data traffic, the device may also be implemented within a UE for connecting to the wireless network, e.g., such as the above-mentioned UE 10. In the case of uplink data traffic, the device may correspond to the above-mentioned TOC 150. In the case of uplink data traffic, the device may also be implemented within a node of the wireless communication network, e.g., as part of a user plane gateway, such as the above-mentioned gateway 120, or within an access node, such as the above-mentioned access node 110.

If a processor-based implementation of the device is used, at least some of the steps of the method of FIG. 7 may be performed and/or controlled by one or more processors of the device. Such device may also include a memory storing program code for implementing at least some of the below described functionalities or steps of the method of FIG. 7.

At step 710, the device receives data traffic from one or more source devices. In the case of downlink data traffic, the one or more source devices may for example correspond to one or more of the above-mentioned IACs 201, 202, 203. In the case of uplink data traffic, the one or more source devices may for example correspond to one or more of the above-mentioned IADs 21, 22, 23, 24. The data traffic is received via the wireless link and via a further device, arranged on a source side of the wireless link. In the case of downlink data traffic, the further device may correspond to the above-mentioned TOC 150. In the case of uplink data traffic, the further device may correspond to the above-mentioned TOD 11.

At step 720, the device forwards the data traffic towards one or more destination devices. In the case of downlink data traffic, the one or more destination devices may for example correspond to one or more of the above-mentioned IADs 21, 22, 23. In the case of uplink data traffic, the one or more destination devices may for example correspond to one or more of the above-mentioned IACs 201, 202, 203.

Accordingly, in some scenarios the one or more source devices may include one or more industrial automation controllers and the one or more destination devices may include one or more industrial automation devices controlled by the one or more industrial automation controllers. In such scenarios the data traffic to be forwarded by the device may include polling requests from the one or more industrial automation controllers to the one or more industrial automation devices and/or control commands from the one or more industrial automation controllers to the one or more industrial automation devices.

In other scenarios, the one or more destination devices may include one or more industrial automation controllers and the one or more source devices may include one or more industrial automation devices controlled by the one or more industrial automation controllers. In such scenarios, the data traffic forwarded by the device may include status reports from the one or more industrial automation devices to the one or more industrial automation controllers.

At step 730, the device detects redundant payload which is common to multiple data frames in the data traffic forwarded by the device. In some scenarios, the one or more destination devices may correspond to multiple destination devices. In this case the multiple data frames may include multiple data frames addressed to different ones of the destination devices. In some scenarios, the one or more source devices may correspond to multiple source devices. In this case the multiple data frames may include multiple data frames from different ones of the source devices. In some scenarios, the multiple data frames may include multiple data frames transmitted at different time instances.

At step 740, the device sends redundancy information to the further device. In the case of downlink data traffic, the redundancy information may for example correspond to above-mentioned redundancy information 307. In the case of uplink data traffic, the redundancy information may for example correspond to above-mentioned redundancy information 407.

If the multiple data frames with redundant payload detected at step 730 include multiple data frames addressed to different ones of multiple destination devices, the redundancy information may indicate the destination devices the multiple data frames are addressed to. If the multiple data frames with redundant payload detected at step 730 include multiple data frames from different ones of the source devices, the redundancy information may indicate the source devices the multiple data frames originate from.

If the multiple data frames with redundant payload detected at step 730 include multiple data frames transmitted at different time instances, the different time instances may define a periodic pattern and the redundancy information may indicate the periodic pattern. In some scenarios, the redundancy information may also indicate a variation pattern of the redundant payload, sequence numbers of the multiple data frames, and/or a pattern underlying the sequence numbers of the multiple data frames.

At step 750, in response to sending the redundancy information at step 740, the device receives further data traffic from the one or more source devices. From the further data traffic received at step 750, redundant payload indicated by the redundancy information was removed by the further device.

At step 760, the device reconstructs the removed redundant payload. This may be accomplished based on information obtained at step 740, e.g., based on the redundancy information sent at 740.

In some scenarios, the device may reconstruct the redundant payload by adding a removed redundant data frame to the data traffic to be forwarded, e.g., by replicating the removed data frame from another data frame which was received at step 750 or at step 710. Alternatively or in addition, the device may reconstruct the indicated redundant payload by adding removed redundant payload to at least data frame of the data traffic to be forwarded. The added removed payload may be based on another data frame received at step 750 or at step 710.

In some scenarios, the further device may also have selectively removed parts of the payload of the data traffic received at step 750 according to priorities assigned to the parts, e.g., due to the parts being assigned a low priority level. In such cases, the device may perform step 770 and apply an interpolation process and/or a machine-learning process to reconstruct the removed parts of the payload. The interpolation process and/or machine-learning process may be based on the payload of the further data traffic received at step 750 and/or on the payload of the data traffic received at step 710. It is noted that in some scenarios the reconstruction of selectively removed parts of payload of step 770 could also be applied independently from the reconstruction of redundant payload of step 760. In such alternative method, steps 730, 740, 750, and 760 could be omitted.

At step 780, the device forwards the received further data traffic with the reconstructed redundant payload towards the one or more destination devices.

Figure 8:
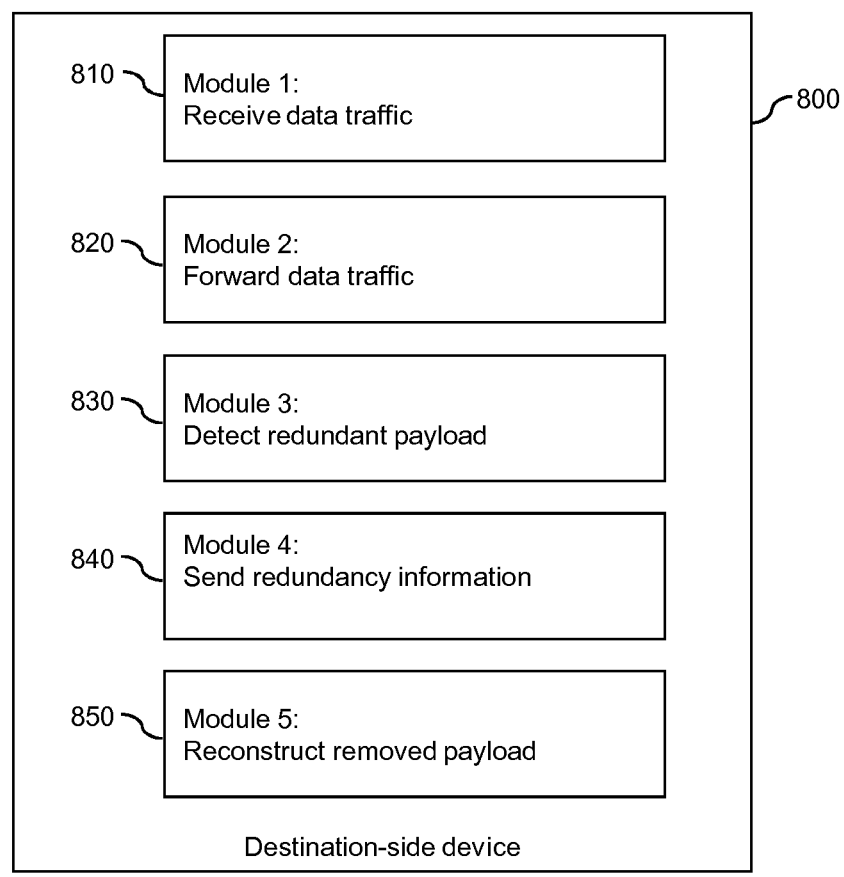
FIG. 8 shows an exemplary block diagram for illustrating functionalities of a network element implementing functionalities corresponding to the method of FIG. 7.

FIG. 8 shows a block diagram for illustrating functionalities of a device 800 which operates according to the method of FIG. 7. The device 800 may have the purpose of handling data traffic on a destination side of a wireless link, e.g., the above-mentioned wireless link 50, and may therefore also be referred to as a destination-side device. In the case of downlink data traffic, the device 800 may correspond to the above-mentioned TOD 11. In the case of uplink data traffic, the device 800 may correspond to the above-mentioned TOC 150. As illustrated, the device 800 may be provided with a module 810 configured to receive data traffic, such as explained in connection with steps 710 and 750. Further, the device 800 may be provided with a module 820 configured to forward the data traffic, such as explained in connection with steps 720 and 780. Further, the device 800 may be provided with a module 830 configured to detect redundant payload, such as explained in connection with step 730. Further, the device 800 may be provided with a module 840 configured to send redundancy information, such as explained in connection with step 740. Further, the device 800 may be provided with a module 640 configured to reconstruct removed payload, such as explained in connection with step 760 and/or 770.

It is noted that the device 800 may include further modules for implementing other functionalities, such as known functionalities of a user plane gateway, access node, or UE. Further, it is noted that the modules of the device 800 do not necessarily represent a hardware structure of the device 800, but may also correspond to functional elements, e.g., implemented by hardware, software, or a combination thereof.

It is noted that the illustrated concepts could also be implemented by a system including a source-side device operating according to the method of FIG. 5 and a destination-side device operating according to the method of FIG. 7. In such system, the source-side device would implement functionalities as described for the device in the method of FIG. 5 and as described for the further device in the method of FIG. 7, and the destination-side device would implement functionalities as described for the device in the method of FIG. 7 and as described for the further device in the method of FIG. 5.

Figure 9:
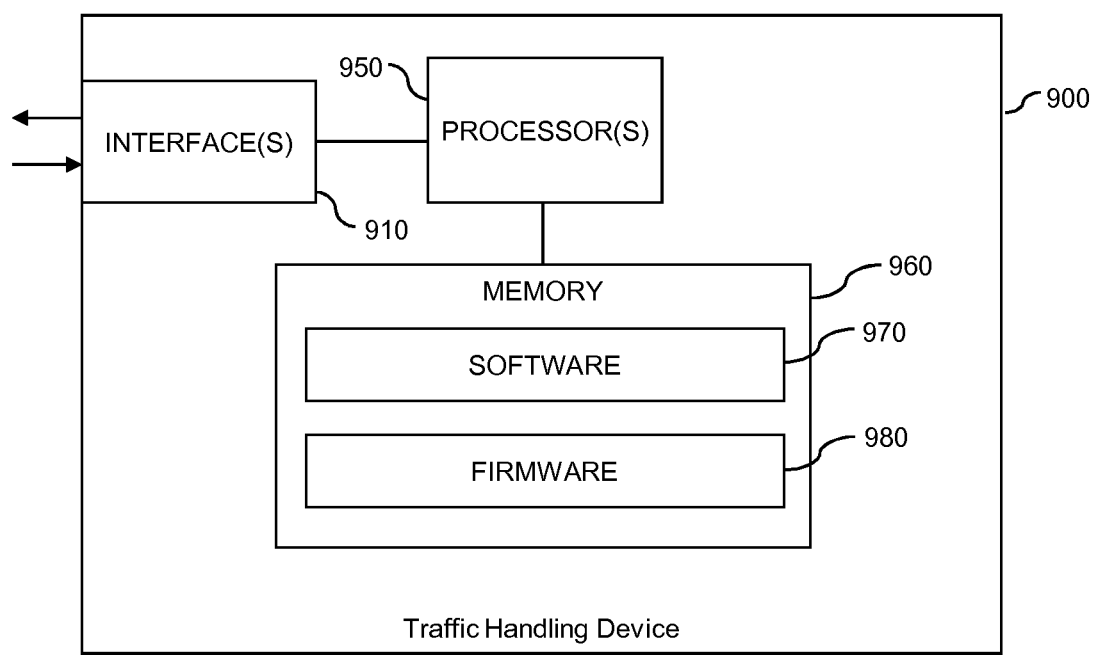
FIG. 9 schematically illustrates structures of a device according to an embodiment of the invention.

FIG. 9 illustrates a processor-based implementation of a traffic handling device 900 which may be used for implementing the above-described concepts. For example, the structures as illustrated in FIG. 9 may be used for implementing the functionalities of the above-mentioned TOC 150 or in the above-mentioned TOD 11.

As illustrated, the traffic handling device 900 includes one or more interfaces 910. In some scenarios, e.g., if the traffic handling device corresponds to an access node or to a UE, the interfaces 910 may include a radio interface for establishing the above-mentioned wireless link. Such radio interface could be based on the NR technology.

Further, the traffic handling device 900 may include one or more processors 950 coupled to the interface(s) 910 and a memory 960 coupled to the processor(s) 950. By way of example, the interface(s) 910, the processor(s) 950, and the memory 960 could be coupled by one or more internal bus systems of the traffic handling device 900. The memory 960 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 960 may include software 970 and/or firmware 980. The memory 960 may include suitably configured program code to be executed by the processor(s) 950 so as to implement the above-described functionalities of a traffic handling device, such as explained in connection with FIGS. 5 to 8.

It is to be understood that the structures as illustrated in FIG. 9 are merely schematic and that the traffic handling device 900 may actually include further components which, for the sake of clarity, have not been illustrated, e.g., further interfaces or processors. Also, it is to be understood that the memory 960 may include further program code for implementing known functionalities of a traffic handling device, e.g., known functionalities of a user plane gateway, of an access node, or of a UE. According to some embodiments, also a computer program may be provided for implementing functionalities of the traffic handling device 900, e.g., in the form of a physical medium storing the program code and/or other data to be stored in the memory 960 or by making the program code available for download or by streaming.

As can be seen, the concepts as described above may be used for efficiently transmitting data traffic through a wireless link established by a wireless network. Specifically, the concepts may be used to reduce overall throughput on the wireless link, by removing redundant payload from the data traffic.

It is to be understood that the examples and embodiments as explained above are merely illustrative and susceptible to various modifications. For example, the illustrated concepts may be applied in connection with various kinds of radio technologies, without limitation to the NR technology, e.g., using the LTE technology. Further, the concepts may be applied with respect to various types of source and destination devices, without limitation to industrial automation devices and industrial automation controllers. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling data traffic in a wireless network, the method comprising:
    a device, arranged on a source side of a wireless link, receiving data traffic from one or more source devices;
    the device forwarding the data traffic via the wireless link and via a further device, arranged on a destination side of the wireless link, towards one or more destination devices;
    the device receiving redundancy information from the further device, the redundancy information indicating redundant payload which is common to multiple data frames in the data traffic forwarded by the device;
    based on the redundancy information, the device removing the indicated redundant payload from at least a part of the data traffic to be forwarded by the device towards the one or more destination devices.

2. The method according to of claim 1, wherein
    the one or more destination devices comprise multiple destination devices,
    the multiple data frames comprise multiple data frames addressed to different ones of the destination devices, and
    the redundancy information indicates the destination devices the multiple data frames are addressed to.

3. The method of claim 1, wherein
    the one or more source devices comprise multiple source devices, the multiple data frames comprise multiple data frames from different ones of the source devices, and
the redundancy information indicates the source devices the multiple data frames originate from.

4. The method of claim 1, wherein
the multiple data frames comprise multiple data frames transmitted at different time instances,
the different time instances define a periodic pattern, and
the redundancy information indicates the periodic pattern.

5. The method of claim 1, wherein
the redundancy information indicates a variation pattern of the redundant payload,
the redundancy information indicates sequence numbers of the multiple data frames and/or a pattern underlying the sequence numbers of the multiple data frames, or
the redundancy information indicates a pattern underlying sequence numbers of the multiple data frames.

6. The method of claim 1, wherein
the device removes the indicated redundant payload by omitting at least one data frame from the data traffic to be forwarded, or
the device removes the indicated redundant payload by removing the redundant payload from at least one data frame of the data traffic to be forwarded.

7. The method of claim 1, comprising:
based on priorities assigned to one or more parts of the payload, the device selectively removing the one or more parts of the payload from the data traffic to be forwarded.

8. The method of claim 1, wherein
the one or more source devices comprise one or more industrial automation controllers and the one or more destination devices comprise one or more industrial automation devices controlled by the one or more industrial automation controllers,
the data traffic forwarded by the device comprises polling requests from the one or more industrial automation controllers to the one or more industrial automation devices, and
the data traffic forwarded by the device comprises control commands from the one or more industrial automation controllers to the one or more industrial automation devices.

9. The method of claim 1, wherein
the one or more destination devices comprise one or more industrial automation controllers and the one or more source devices comprise one or more industrial automation devices controlled by the one or more industrial automation controllers, and
the data traffic forwarded by the device (11; 600; 900) comprises status reports from the one or more industrial automation devices to the one or more industrial automation controllers.

10. A method of controlling data traffic in a wireless network, the method comprising:
a device, arranged on a destination side of a wireless link, receiving data traffic from one or more source devices via the wireless link and via a further device, arranged on a source side of the wireless link;
the device forwarding the received data traffic towards one or more destination devices;
the device detecting redundant payload which is common to multiple data frames in the data traffic received by the device;
the device sending redundancy information indicating the detected redundant payload to the further device;
in response to sending the redundancy information, the device receiving further data traffic from which the indicated redundant payload was removed by the further device;
the device reconstructing the removed redundant payload; and
the device forwarding the received further data traffic with the reconstructed redundant payload towards the one or more destination devices.

11. The method of claim 10, wherein
wherein the one or more destination devices comprise multiple destination devices,
the multiple data frames comprise multiple data frames addressed to different ones of the destination devices,
the redundancy information indicates the destination devices the multiple data frames are addressed to.

12. The method of claim 10, wherein
the one or more source devices comprise multiple source devices,
the multiple data frames comprise multiple data frames from different ones of the source devices, and
the redundancy information indicates the source devices the multiple data frames originate from.

13. The method of claim 10, wherein
the multiple data frames comprise multiple data frames transmitted at different time instances,
the different time instances define a periodic pattern, and
the redundancy information indicates the periodic pattern.

14. The method of claim 10, wherein
the redundancy information indicates a variation pattern of the redundant payload,
the redundancy information indicates sequence numbers of the multiple data frames and/or a pattern underlying the sequence numbers of the multiple data frames, or
the redundancy information indicates a pattern underlying sequence numbers of the multiple data frames.

15. The method of claim 10, wherein
the device reconstructs the redundant payload by adding a removed redundant data frame to the data traffic to be forwarded, or
the device reconstructs the indicated redundant payload by adding removed redundant payload to at least data frame of the data traffic to be forwarded, or
the device reconstructs the indicated redundant payload based on an interpolation process and/or machine-learning process.

16. The method of claim 10,
wherein the one or more source devices comprise one or more industrial automation controllers and the one or more destination devices comprise one or more industrial automation devices controlled by the one or more industrial automation controllers,
the data traffic forwarded by the device comprises polling requests from the one or more industrial automation controllers to the one or more industrial automation devices, and
the data traffic forwarded by the device comprises control commands from the one or more industrial automation controllers to the one or more industrial automation devices.

17. The method of claim 10, wherein
the one or more destination devices comprise one or more industrial automation controllers and the one or more source devices comprise one or more industrial automation devices controlled by the one or more industrial automation controllers, and the data traffic forwarded by the device comprises status reports from the one or more industrial automation devices to the one or more industrial automation controllers.

18. A device for handling data traffic, the device comprising:
at least one processor, and
a memory containing program code executable by the at least one processor,
wherein execution of the program code by the at least one processor causes the device to:
forward data traffic via a wireless link and via a further device; arranged on a destination side of the wireless link towards one or more destination devices;
based on redundancy information received from the further device, wherein the redundancy information indicates redundant payload which is common to multiple data frames in the data traffic forwarded by the device, remove the indicated redundant payload from at least a part of the data traffic to be forwarded by the device towards the one or more destination devices.

19. A device for handling data traffic, the device comprising:
at least one processor, and
a memory containing program code executable by the at least one processor,
wherein execution of the program code by the at least one processor causes the device to:
receive data traffic from one or more source devices via the wireless link and via a further device, arranged on a source side of the wireless link;
forward towards one or more destination devices data traffic received from a further device;
detect redundant payload which is common to multiple data frames in the data traffic;
send redundancy information indicating the detected redundant payload to the further device;
after sending the redundancy information, process further data traffic from which the indicated redundant payload was removed by the further device, wherein the processing reconstructing the removed redundant payload;
forward the further data traffic with the reconstructed redundant payload towards the one or more destination devices.

\* \* \* \* \*